(12) United States Patent  
Mouroux et al.

(10) Patent No.: US 11,640,597 B2  
(45) Date of Patent: May 2, 2023

(54) METHOD OF MANAGING AN EMERGENCY MODE TRANSACTION PROCEDURE, AND AN ASSOCIATED DEVICE

(71) Applicant: IDEMIA FRANCE, Courbevoie (FR)

(72) Inventors: Benoit Mouroux, Courbevoie (FR); Aghiles Adjaz, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 211 days.

(21) Appl. No.: 16/433,562

(22) Filed: Jun. 6, 2019

(65) Prior Publication Data

US 2019/0378114 A1    Dec. 12, 2019

(30) Foreign Application Priority Data

Jun. 8, 2018    (FR) ...................................... 1855026

(51) Int. Cl.
*G06Q 20/32*    (2012.01)
*G06Q 20/38*    (2012.01)
*G06Q 20/40*    (2012.01)

(52) U.S. Cl.
CPC ..... *G06Q 20/3226* (2013.01); *G06Q 20/3223* (2013.01); *G06Q 20/38215* (2013.01); *G06Q 20/401* (2013.01)

(58) Field of Classification Search
CPC ........... G06Q 20/3226; G06Q 20/3223; G06Q 20/38215; G06Q 20/401; G06Q 20/354; G06Q 20/327; G06Q 20/3278; G06Q 20/34; G06F 11/0709; G06F 11/2028; G06F 11/2038; G06F 11/2048; G06F 11/0751; H04W 12/03; H04W 4/30; H04W 4/80; H04W 12/06; H04L 69/40
See application file for complete search history.

(56) References Cited

U.S. PATENT DOCUMENTS

| | | | |
|---|---|---|---|
| 10,956,894 B2 * | 3/2021 | O'Toole | G06Q 20/326 |
| 2001/0027439 A1 * | 10/2001 | Holtzman | G01R 33/50 705/39 |
| 2008/0076425 A1 | 3/2008 | Khetawat et al. | |
| 2011/0321173 A1 | 12/2011 | Weston et al. | |

(Continued)

OTHER PUBLICATIONS

Preliminary Search Report dated Nov. 28, 2018 in corresponding FR Application No. 1855026, 2 pages.

(Continued)

*Primary Examiner* — Patrick McAtee
*Assistant Examiner* — Vincent I Idiake
(74) *Attorney, Agent, or Firm* — MH2 Technology Law Group, LLP

(57) ABSTRACT

A method and device for managing an emergency procedure of an emergency transaction mode that can be activated in the event of a computer attack on or a failure of a transaction network. The method may be carried out by an electronic device suitable for performing a transaction in a normal mode or in the emergency mode. The method performs operations that may include receiving an activation command for activating the emergency mode procedure, where the command includes an identifier of the procedure and first encrypted data; verifying the activation command, which includes verifying the first encrypted data; and if verification of the command is successful, activating the emergency procedure.

12 Claims, 7 Drawing Sheets

(56) References Cited

U.S. PATENT DOCUMENTS

| | | | |
|---|---|---|---|
| 2017/0193498 A1* | 7/2017 | Metral | G06Q 20/401 |
| 2018/0145967 A1* | 5/2018 | Matsugashita | H04L 9/3213 |
| 2019/0130386 A1* | 5/2019 | Bhat | G06Q 20/322 |
| 2022/0141311 A1* | 5/2022 | Tang | H04L 67/55 |
| | | | 709/226 |

OTHER PUBLICATIONS

Unknown, Section 6 of "EMV Integrated Circuit Card Specifications for Payment Systems Book 3 Application Specification Version 4.3", Nov. 1, 2011, XP055527907, pp. 41-69.

\* cited by examiner

FIG.7

| Value | Source | |
|---|---|---|
| Amount, Authorised (Numeric) | Terminal | D1 |
| Amount, Other (Numeric) | Terminal | D2 |
| Terminal Country Code | Terminal | D3 |
| Terminal Verification Results | Terminal | D4 |
| Transaction Currency Code | Terminal | D5 |
| Transaction Date | Terminal | D6 |
| Transaction Type | Terminal | D7 |
| Unpredictable Number | Terminal | D8 |
| Application Interchange Profile | ICC | D9 |
| Application Transaction Counter | ICC | D10 |
| Issuer Application Data | ICC | D11 |

| Byte(s) | Contents | Description |
|---|---|---|
| 1 | Length Indicator | Length of EMVCo-defined data in IAD. Set to '0F' |
| 2 | CCI | Common Core Identifier |
| 3 | DKI | Derivation Key Index |
| 4-8 | CVR | Card Verification Results (see section C7.3) |
| 9-16 | Counters | Contents are at the discretion of the Payment System |
| 17 | Length Indicator | Length of Issuer Discretionary Data field in IAD.Set to '0F' |
| 18-32 | Issuer Discretionary Data | Contents are at the discretion of the issuer |

Table CCD9: Issuer application data for format code 'A'

CVR Byte 1

| b8 | b7 | b6 | b5 | b4 | b3 | b2 | b1 | Meaning |
|---|---|---|---|---|---|---|---|---|
| x | x | | | | | | | Application Cryptogram Type Returned in Second GENERATE AC |
| 0 | 0 | | | | | | | AAC |
| 0 | 1 | | | | | | | TC |
| 1 | 0 | | | | | | | Second GENERATE AC Not Requested |
| 1 | 1 | | | | | | | RFU |

METHOD OF MANAGING AN EMERGENCY MODE TRANSACTION PROCEDURE, AND AN ASSOCIATED DEVICE

CROSS-REFERENCE TO RELATED APPLICATIONS

This application claims priority to French Application No. 1855026 filed 8 Jun. 2018, which is hereby incorporated by reference in its entirety.

BACKGROUND OF THE INVENTION

The present invention relates to the field of transactions effected by means of an electronic device, and it relates more particularly to a method of managing an emergency mode transaction procedure, which method may be activated in the event of an attack on or a failure of a transaction network.

In known manner, numerous bank transactions are effected on line, by means of an electronic device, via an electronic banking network.

The electronic banking network is a target for computer pirates having financial or political motives. Specifically, a computer attack on an electronic banking network can have harmful economic repercussions on a country-wide scale. When the country is a developed country in which most transactions are carried out electronically, such an attack can typically paralyze the country's economy.

In addition to the financial costs, a computer attack on or a failure of an electronic banking network has a negative impact on the experience of users of the banking network and on the reputation of the banking organization using that banking network.

There therefore exists a need for a solution that enables the resilience of electronic banking networks to be improved by limiting the negative impact of a computer attack on users and on the banking organization.

OBJECT AND SUMMARY OF THE INVENTION

For this purpose, the present invention provides a method of managing an emergency procedure of an emergency transaction mode that can be activated in the event of a computer attack on or a failure of a transaction network, the method being carried out by an electronic device suitable for performing a transaction in a normal mode or in the emergency mode, said method comprising the following steps:
  receiving an activation command for activating said emergency mode procedure, the command comprising an identifier of the procedure and first encrypted data;
  verifying the activation command, comprising verifying said first encrypted data;
  if verification of the command is successful, activating the emergency procedure.

Activating an emergency mode procedure, which is unaffected by the attack or the failure, serves to improve the resilience of the transaction network. This activation makes it possible to limit the negative impact of a computer attack on users and on the banking organization, and users can continue to effect operations by means of the emergency procedure.

In a particular implementation, the first encrypted data is an authentication code calculated as a function of a private key, said private key being obtained by using the identifier of said procedure.

In a particular implementation, the verification step comprises verifying that the value of the identifier of said procedure is greater than the value of a procedure identifier stored in the electronic device.

In a particular implementation, after activating the emergency procedure and after initializing a transaction between the electronic device and a reader, the method comprises a step of sending a message to said reader comprising a consultation request to consult a normal mode server of the transaction network.

In a particular implementation, on receiving a message indicating that consultation of the normal mode server has failed, the method comprises a step of sending a cryptogram to said reader comprising at least one information element about said procedure, selected from among the following:
  a starting date for said procedure;
  an ending date for said procedure;
  said identifier of said procedure;
  an indication whereby said cryptogram was generated while carrying out said procedure.

In a particular implementation, said received message comprises a transaction date, the method comprising the following steps:
  verifying that the transaction date lies between a starting date and an ending date for the procedure;
  if the transaction date is earlier than the starting date or later than the ending date for the procedure, deactivating said procedure.

In a particular implementation, the received message comprises the amount of the transaction, the method comprising the following steps:
  incrementing a transaction number count;
  incrementing a transaction amount count;
  if the incremented transaction number count is less than a transaction number threshold value and if the transaction amount count is less than a transaction amount threshold value, a step of accepting the transaction.

In a particular implementation, the method comprises a step of authenticating a user of the electronic device, the step of verifying the activation command being carried out providing the authentication step is successful.

In a particular implementation, the method comprises a step of deactivating said procedure on receiving a deactivation command for deactivating said procedure.

The invention also provides an electronic device suitable for carrying out a method as described above.

In a particular embodiment, the various steps of the management method are determined by computer program instructions.

Consequently, the invention also provides a computer program on a data medium (or recording medium), the program being suitable for being carried out by an electronic device or more generally in a computer, the program including instructions adapted to carry out steps of the management method as defined above.

The program may use any programming language, and be in the form of source code, object code, or code intermediate between source code and object code, such as in a partially compiled form, or in any other desirable form.

The invention also provides a data medium (or recording medium) that is readable by an electronic device or more generally by a computer, and that includes instructions of a computer program as mentioned above.

The data medium may be any entity or device capable of storing the program. For example, the medium may comprise storage means, such as a rewritable non-volatile memory (of the electrically erasable programmable read only memory (EEPROM) type or of the flash NAND type, for example), or such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character.

In the figures:

FIG. 7 is a diagram showing data used during a cryptogram generation step in management methods in accordance with implementations of the invention.

DETAILED DESCRIPTION OF IMPLEMENTATIONS

Figure 1:
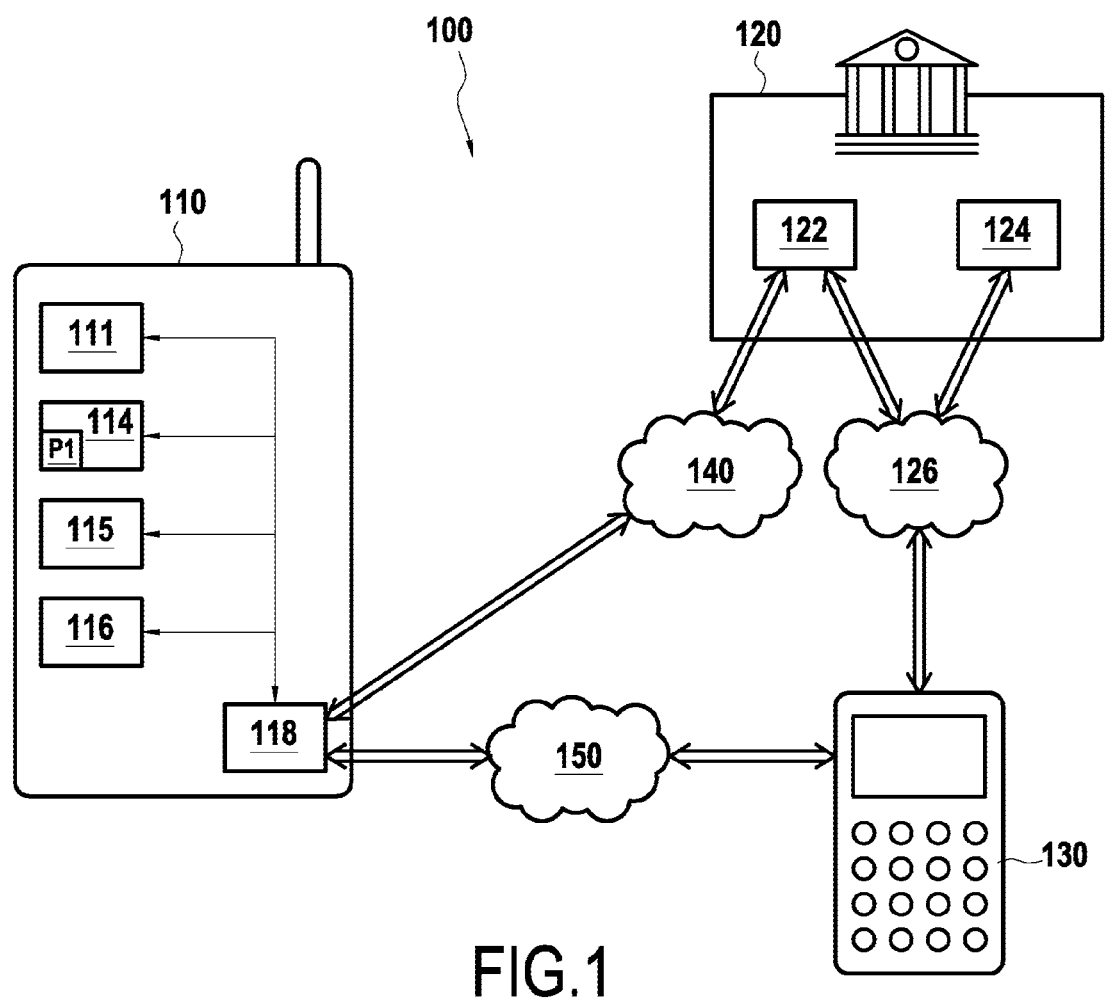
FIGS. 1 and 2 are diagrams showing management systems in accordance with implementations of the invention.
Figure 2:
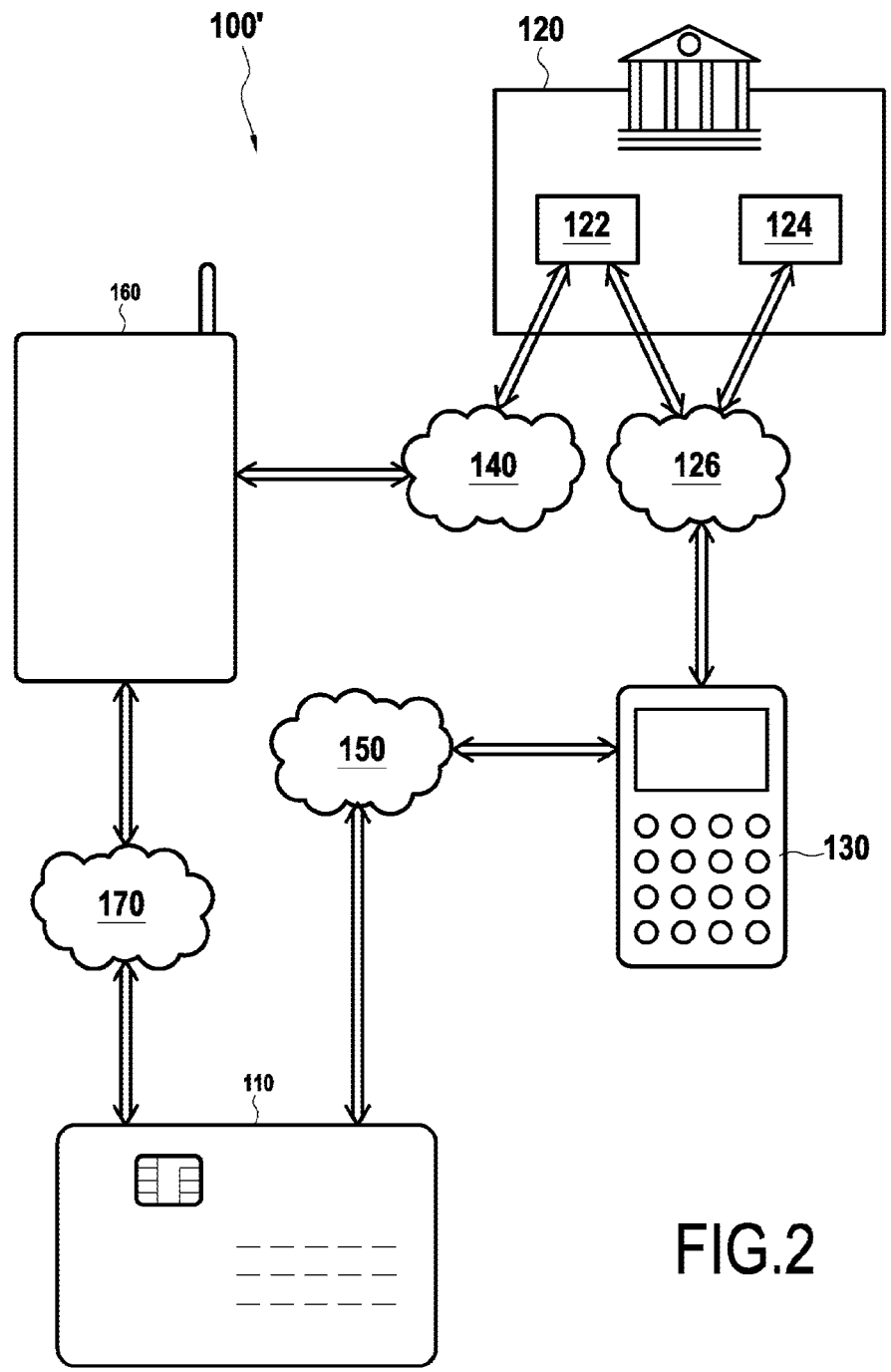

FIGS. 1 and 2 are diagrams showing management systems 100 or 100' in accordance with implementations of the invention, suitable for performing management methods in accordance with implementations of the invention, e.g. the method described with reference to FIGS. 2, 4, and 5 for the system 100 of FIG. 1, or the method described with reference to FIGS. 3, 4, and 5 for the system 100' of FIG. 2.

The system 100, 100' comprises a first electronic device 110 having the conventional architecture of a computer. The first electronic device 110 comprises in particular a processor 112, a ROM 114, a rewritable non-volatile memory 115 (e.g. of EEPROM type or of flash NAND type), a rewritable volatile memory 116 (of random access memory (RAM)) type, and a communications interface 118.

In this example, the ROM 114 constitutes a data medium (or recording medium) in accordance with a particular embodiment of the invention. The ROM 114 stores a computer program P1 enabling the first electronic device 110 to perform a management method in accordance with an implementation of the invention, or at least a portion of the management method. In a variant, the computer program P1 is stored in the rewritable non-volatile memory 115.

The first electronic device 110 is suitable for performing a transaction in a normal transaction mode or in an emergency transaction mode.

The term "transaction mode" is used herein to mean a step of rules applied while carrying out a transaction.

The normal transaction mode is a transaction mode used by the electronic device 110 under normal conditions of use.

The set of rules applied while using the normal mode is typically defined in a specification, e.g. the Europay, Mastercard and Visa (EMV) specification.

The emergency transaction mode is a transaction mode used instead of the normal transaction mode when the normal transaction mode cannot be used, typically in the event of a computer attack on or a failure of the transaction network. The set of rules that can be applied while using the emergency mode is described below, with reference to FIGS. 3 to 6.

In order to perform a transaction in normal mode or in emergency mode, the first electronic device 110 can use an application for performing transactions, typically stored in the ROM 114 or the rewritable non-volatile memory 115 of the first electronic device 110. By way of example, such an application is implemented by a transaction operator such as a banking organization, typically a banking organization managing a bank account of the user of the first electronic device 110, which application can subsequently be downloaded by the first electronic device 110. The application typically includes the program P1.

The application may comprise data associated with the emergency mode and selected from the following:

an identifier of a procedure PMS for the emergency mode;
a starting date for said procedure PMS;
an ending date for said procedure PMS;
a threshold value for a number of transactions that can be effected during said procedure PMS;
a threshold value for a total transaction amount that can be debited during said procedure PMS;
a count for counting the number of transactions;
a count for adding the transaction amounts.

The application may also include a first key dedicated to the emergency mode, a second key dedicated to the emergency mode, and/or an emergency mode flag that may typically take the value "0" or "1".

In a variant, this data is stored in the ROM 114 or in the rewritable non-volatile memory 115 of the first electronic device 110, outside the application.

The normal transaction mode and the emergency transaction mode are typically managed by distinct servers of a transaction network 120, the transaction network 120 using a telecommunications network 126 and typically being an electronic banking network.

An electronic banking network typically makes use of a private telecommunications network 126 that is used by at least one banking transaction operator, each banking transaction operator possibly being a banking organization or a services provider (e.g. providing interbank compensation). The Visa or Mastercard networks are examples of electronic banking networks.

The emergency transaction mode is managed in particular by at least one emergency mode server 122 of the transaction network, while the normal transaction mode is managed in particular by a normal mode server 124 of the transaction network.

A transaction is also performed by means of a reader 130 associated with the other party to the transaction (the party other than the user of the first electronic device 110). Typically, the reader 130 is a mobile telephone, e.g. of the "smartphone" type, or a digital tablet, or a personal computer.

The system 100 or 100' can thus also include the emergency mode server 122, the normal mode server 124, and/or the reader 130.

The emergency mode server 122, the normal mode server 124, and/or the reader 130 may also present the conventional architecture of a computer, with each of them then comprising in particular a processor, a ROM, a rewritable non-volatile memory (e.g. of EEPROM type or of flash NAND type), a rewritable volatile memory (or RAM), and a communication interface.

Each ROM may constitute a data medium in accordance with an embodiment of the invention that is readable by the associated processor and that stores a computer program in accordance with an embodiment of the invention. In a variant, the computer program is stored in the associated rewritable non-volatile memory. The computer program may enable at least a portion of the management method in accordance with an implementation of the invention to be carried out.

As shown in FIG. 1, and by way of example, the first electronic device 110 may be a fixed or mobile terminal such as a mobile telephone, e.g. of the "smartphone" type, a digital tablet, or a personal computer.

The first electronic device 110 is then suitable for communicating with the emergency mode server 122 via a first telecommunications network 140, this first telecommunications network 140 typically being a long-range network, such as an Internet network, a WiFi network, or a fixed or mobile telephone network (of 3G, 4G, etc. type).

In addition, the first electronic device 110 and the reader 130 are suitable for communicating with each other via the first telecommunications network 140 or via a second telecommunications network 150. The second telecommunications network 150 is typically a short-range network, such as a near-field communication (NFC) network.

In addition, the reader 130, the normal mode server 124, and/or the emergency mode server 122 are suitable for communicating with one another via the telecommunications network 126 used by the transaction network 120, this telecommunications network 126 being referred to below as the third telecommunications network 126.

In a variant, and as shown in FIG. 2, the first electronic device 110 may be a smart card (typically a bank card), e.g. in the ID-1 format as specified by ISO/IEC standard 7810, presenting dimensions of 85.6 millimeters (mm) by 53.98 mm by 0.76 mm.

The system 100' may then further comprise a second electronic device 160, this second electronic device 160 being a fixed or mobile terminal such as a mobile telephone, e.g. of the smartphone type, a digital tablet, or a personal computer.

The first electronic device 110 and the second electronic device 160 can communicate with each other via a fourth telecommunications network 170, this fourth telecommunications network 170 typically being a short-range network, such as an NFC network. The fourth telecommunications network 170 may be the same network as the second telecommunications network 150, or it may be a distinct network.

In addition, the second electronic device 160 is suitable for communicating with the emergency mode server 122 via the first telecommunications network 140. The second electronic device 160 may include an application associated with the transactions operator.

In addition, the first electronic device 110 and the reader 130 are suitable for communicating with each other via the first telecommunications network 140, the second telecommunications network 150, or directly by means of contacts when the first electronic device 110 is inserted into the reader 130.

In addition, the reader 130, the normal mode server 124, and/or the emergency mode server 122 are suitable for communicating with one another via the third telecommunications network 126.

Figure 3:
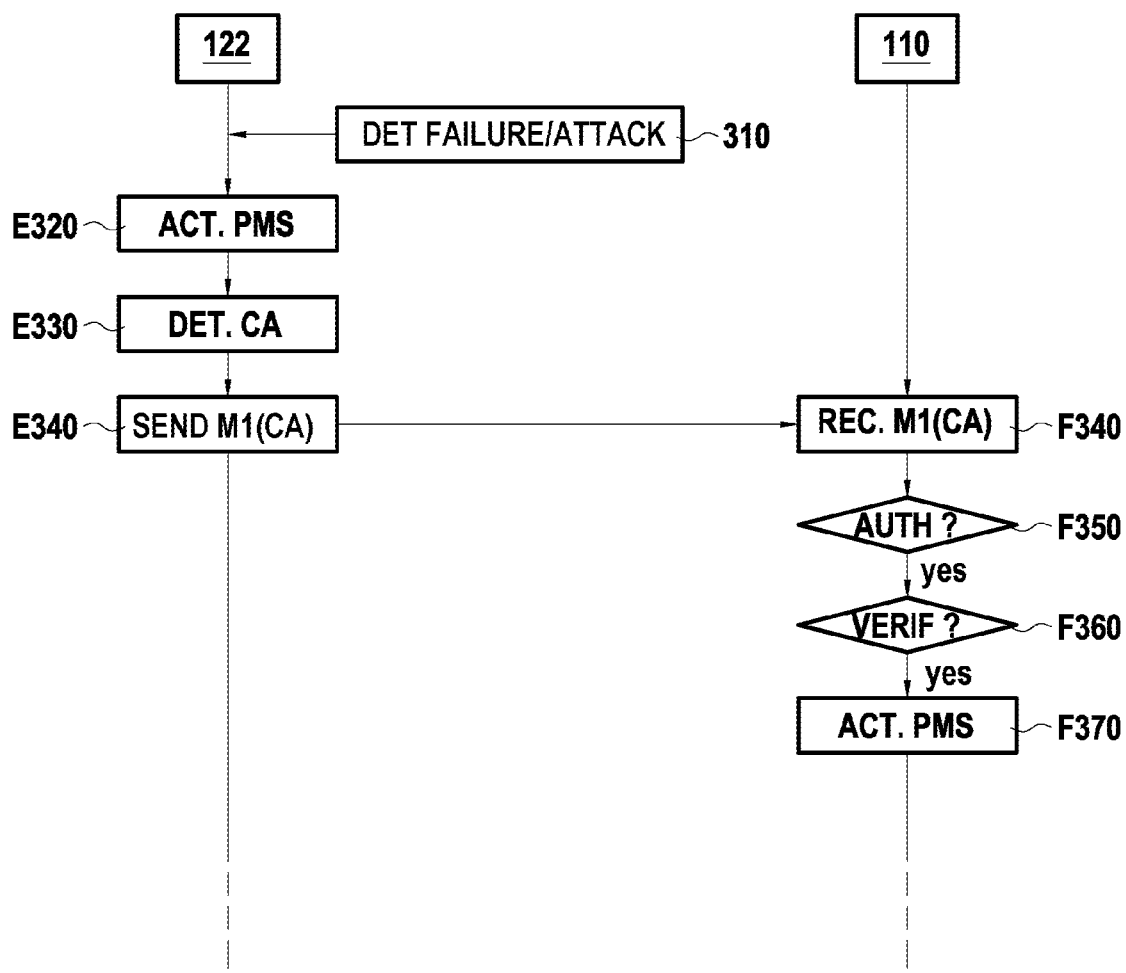
FIGS. 3 and 4 are flow charts showing the main steps of stages of activating of management methods in accordance with implementations of the invention.
Figure 4:
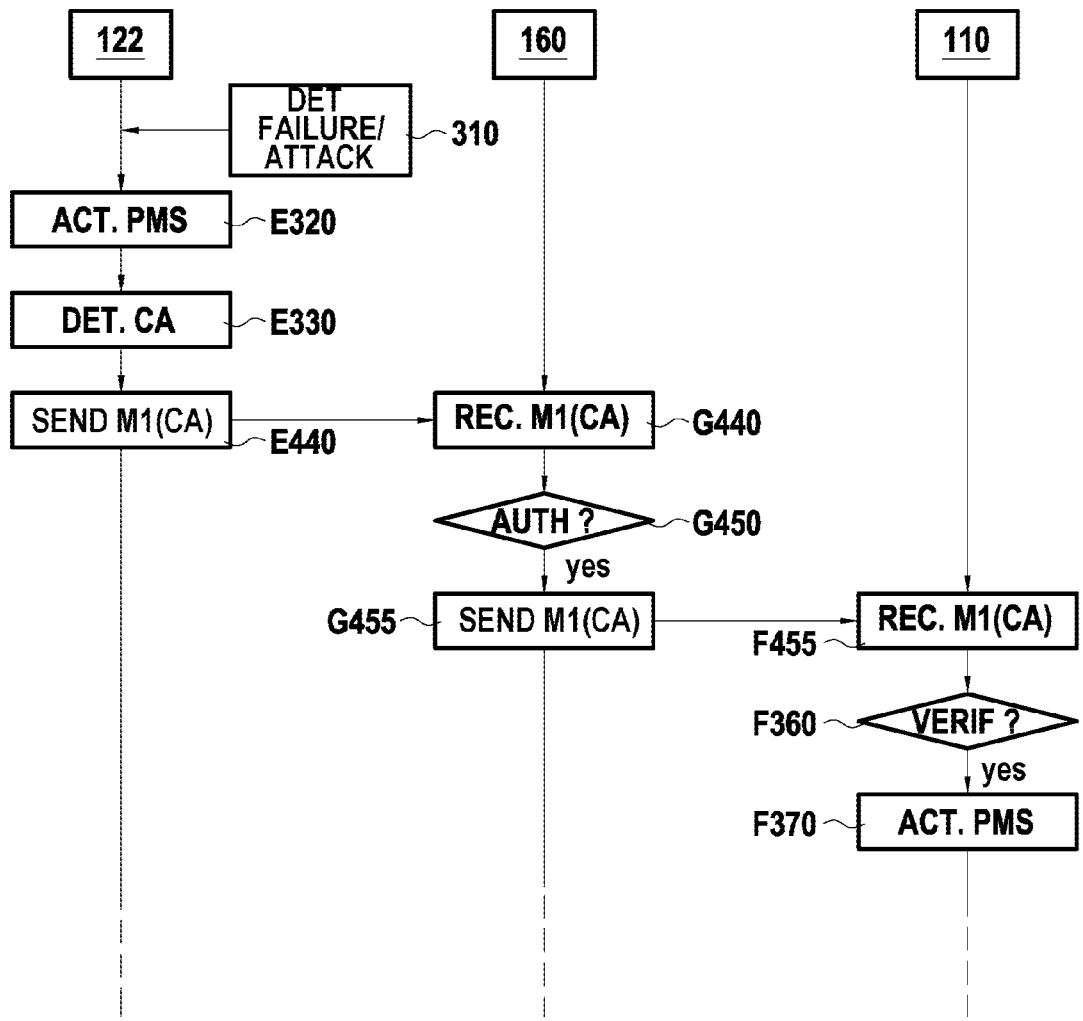
Figure 5:
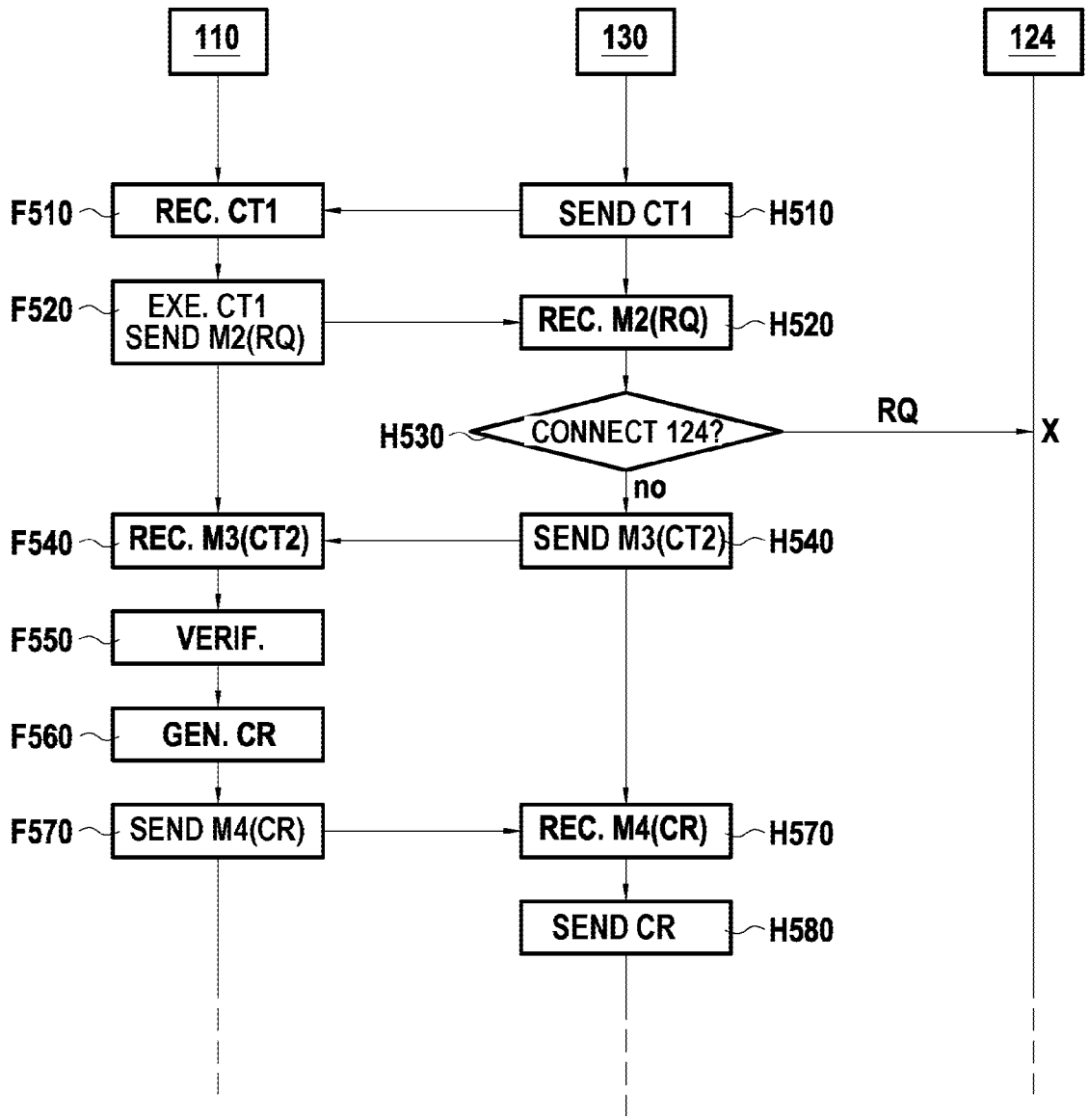
FIG. 5 is a flow chart showing the main steps of a payment stage of management methods in accordance with implementations of the invention.
Figure 6:
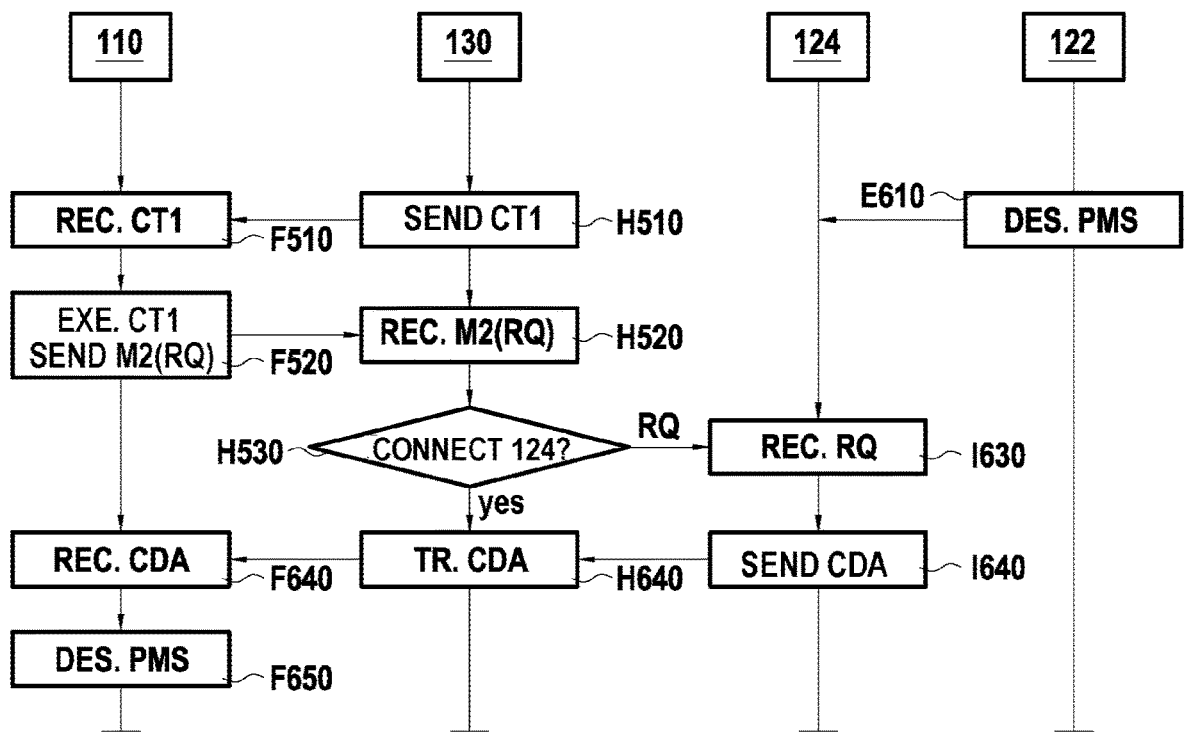
FIG. 6 is a flow chart showing the main steps of a deactivation stage of methods of management methods in accordance with implementations of the invention.

FIGS. 3, 5, and 6, and also FIGS. 4, 5, and 6 show methods of managing an emergency transaction mode procedure in accordance with implementations of the invention.

FIG. 3 shows an activation stage of a management method in accordance with an implementation of the invention, this activation stage serving to activate an emergency procedure PMS of the emergency mode, typically in the event of a computer attack on the transaction network or a failure of the transaction network.

In the description below of FIG. 3, it is assumed that said activation stage is carried out by the FIG. 1 management system 100. Nevertheless, this method may be carried out by any management system comprising a terminal suitable for performing a transaction in normal transaction mode or in emergency transaction mode.

In a step 310, a computer attack on or a failure of the transaction network 120 is detected (typically at the normal mode server 124 level).

In a step E320, the emergency mode server 122 can then activate the emergency mode procedure PMS at the emergency mode server 122 level, typically after requesting authority to activate from one or more people responsible for such activation.

The emergency mode procedure is a procedure carried out during a predetermined period in which the normal transaction mode cannot be used, because of the failure or the attack. Each procedure that is activated in step E320 is thus associated with a single failure or attack detected in step 310.

Thereafter, the emergency mode server 122 can determine an activation command CA for activating the emergency mode procedure PMS (step E330). The activation command CA is typically a command similar to the script commands defined by the EMV standard, with the parameters of the activation command typically being defined by ISO standard 7816. This activation command CA includes an identifier of the procedure PMS together with first encrypted data.

The identifier of the procedure PMS serves to identify the emergency mode procedure PMS from among one or more possible other emergency mode procedures (associated with other failures or attacks). A new emergency mode procedure is activated each time a new computer attack or a new failure is detected on the transaction network, and thus each time the step 310 is performed again. Thus, the identifier of the procedure PMS is typically a number that is incremented each time the step 310 is carried out.

The first encrypted data is typically an authentication code that is calculated as a function of a private key, said private key being obtained by using the identifier of the procedure PMS.

For example, the authentication code is a message authentication code (MAC). The MAC code may be calculated by using a session key derived from the first key dedicated to emergency mode, the identifier of the procedure PMS being used as a derivation value. The first key is typically a symmetrical key used while calculating the integrity of the data of the activation command CA.

The activation command CA may also comprise data relating to the emergency procedure PMS selected from the following:

a starting date for the procedure PMS;
an ending date for the procedure PMS;

a threshold value for the number of transactions that can be effected during said procedure PMS;

a threshold value for a total transaction amount that can be debited during said procedure PMS.

By way of example, the activation command CA has a field CLA defining the class of the instruction, a field INS defining the instruction (this instruction being activating the emergency mode procedure PMS), fields P1 and P2 defining parameters of the instruction, a field LC defining the length of the activation command CA, a field DATA comprising the identifier of the emergency procedure PMS and optionally data relating to the above-mentioned emergency procedure PMS, and a field MAC comprising the first encrypted data.

The emergency mode server 122 can then act during a step E340 to send a first message M1 to the first electronic device 110 (typically the application of the first electronic device 110) via the first telecommunications network 140, which first message M1 comprises the activation command CA.

The first message M1 may also comprise an information message for the user of the first electronic device 110, typically indicating that the emergency mode procedure PMS can be activated on the first electronic device 110.

On receiving F340 the first message M1, the first electronic device 110 can display the information message. The first electronic device 110 can also authenticate the user of first electronic device 110 (step F350). By way of example, user authentication may be carried out by means of an authentication code or of user biometric data.

In a step F360, the first electronic device 110 verifies the received activation command CA, this step E360 typically being carried out once the user is authenticated. This verification step F360 comprises verifying the first encrypted data.

Typically, the first electronic device 110 calculates second encrypted data and then compares the second encrypted data with the first encrypted data. If the second encrypted data is identical to the first encrypted data, then the first encrypted data has been verified successfully.

Thus, the second encrypted data is typically an authentication code calculated as a function of a private key, said private key being obtained by using the identifier of the procedure PMS, such as the code MAC, calculated by using a session key derived from the first key dedicated to the emergency mode, the identifier of the procedure PMS being used as the derivation value.

In addition, the verification step F360 may comprise verifying that the value of the identifier of said procedure PMS is greater than the value of the procedure identifier stored in the first electronic device 110, which at this stage of the method corresponds to the preceding detection 310 of a computer attack on or a failure of the transaction network.

The verification step F360 may also comprise verifying that the procedure PMS is not already activated.

More precisely, the first electronic device 110 verifies that the emergency mode flag is not at the value "1". This verification serves to counter a potential attack at the first electronic device 110 level. Specifically, as described above, activating the procedure PMS may comprise reinitializing data associated with the emergency mode, e.g. such as the total transaction amount. Verifying the emergency mode flag then serves to prevent a plurality of successive malicious reinitializations of that data.

If verification of the activation command CA is successful, the first electronic device 110 activates the emergency procedure PMS at the first electronic device 110 level (step F370).

This activation step F370 may comprise initializing or reinitializing data stored by the electronic device 110 and associated with the emergency mode. For example:

the starting and ending dates of the procedure PMS stored by the electronic device 110 may be updated as a function of the starting and ending dates of the procedure PMS received in step F340;

the count of the number of transactions and the count of the transaction amounts may be reset to zero;

the threshold value for the number of transactions and the threshold value for a total transaction amount stored by the electronic device 110 may be updated as a function of the threshold value for a number of transactions and of the threshold value for a total transaction amount as received in step F340; and/or the identifier of the emergency mode procedure stored by the electronic device may be updated as a function of the identifier of the procedure as received in step F340; and/or the emergency mode flag is set to the value "1".

FIG. 4 shows a variant of the activation stage, carried out by the FIG. 2 system 100' or by any management system including a smart card suitable for performing a transaction in the normal transaction mode or in the emergency transaction mode.

This variant of the activation stage differs from the activation stage described with reference to FIG. 3 in that the emergency mode server 122 sends the first message M1 in step E440 to the second electronic device 160 (e.g. to the application of the second electronic device 160) via the first telecommunications network 140. The steps E320 and/or E330 described above with reference to FIG. 3 may also be performed by the emergency mode server 122 after step 310 and before step E440.

On receiving G440 the first message M1, the second electronic device 160 can display the information message and/or can authenticate the user of the first electronic device 110 (step G450), typically by means of an authentication code or of user biometric data.

The second electronic device 160 can then send a notification requesting the user to place the first electronic device 110 close to the second electronic device 160 so that they communicate via the third telecommunications network 170.

In a step G455, the second electronic device 160 transmits the activation command CA via the fourth telecommunications network 170 to the first electronic device 110, this step G455 typically being carried out once the user is authenticated. The first electronic device 110 then carries out the steps F360 and F370 as described above with reference to FIG. 3.

FIG. 5 shows a payment stage of management methods in accordance with implementations of the invention. Said payment stage may be carried out by the system 100 of FIG. 1 or by the system 100' of FIG. 2 after the stage of activating the emergency mode procedure PMS of FIG. 3 or of FIG. 4.

In a step H510, the reader 130 sends a first transaction command CT1, this transaction command CT1 typically being a "Generate AC" command. The first transaction command CT1 is typically sent via the second telecommunications network 150.

Several other commands may be exchanged between the reader 130 and the first electronic device 110 prior to sending the "Generate AC" first command CT1. The "Generate AC" first command CT1 serves to perform the transaction and provide a result.

The step H510 is carried out when the user of the first electronic device 110 seeks to effect a transaction with the user of the reader 130, and it is thus sent after a transaction has been initialized between the first electronic device 110 and the reader 130.

After receiving F510 the first transaction command CT1, the first electronic device 110 executes said first transaction command CT1 in a step F520.

With the emergency mode procedure PMS activated, the first electronic device 110, while executing the first transaction command CT1, sends a second message M2 comprising a consultation request RQ to consult the normal transaction mode server 124. The second message M2 may be sent to the reader 130 via the second telecommunications network 150.

The reader 130 receives the second message M2 (step H520) and then attempts to connect with the normal mode server 124 by sending the consultation request RQ of the message M2 to the normal mode server 124 via the third telecommunications network 126 (step H530).

Since the emergency mode procedure PMS is activated, the normal mode server 124 does not respond to the consultation request RQ, and the attempt by the reader 130 to connect with the normal mode server 124 fails.

Thereafter, the reader 130 sends a third message M3 to the first electronic device 110, typically via the second telecommunications network 150, the third message M3 comprising a second transaction command and possibly comprising at least one transaction data (step H540). The second command is typically a "Generate AC" command and it indicates that the connection to the normal mode server 124 has failed.

On receiving F540 the third message M3 and, in a step F550, the first electronic device 110 executes the second command by proceeding at least with one verification associated with the transaction (step F550).

Each verification is typically based on transaction data of the third message M3, which data may for example be a transaction date or a transaction amount.

For example, the first electronic device 110 verifies that the transaction date lies between the starting date for the procedure PMS and the ending date for the procedure PMS as stored in the first electronic device 110.

If the transaction date is earlier than the starting date or later than the ending date of the procedure PMS, the first electronic device 110 deactivates said procedure PMS, typically by setting the emergency mode flag to "0". Thereafter, the transaction is processed in normal mode.

The first electronic device 110 can also increment the transaction number count by one.

Thereafter, the first electronic device 110 can verify whether the incremented transaction number count is less than the transaction number threshold value.

If the incremented transaction number count is greater than the transaction number threshold value, then the first electronic device 110 deactivates the emergency mode procedure PMS, typically by setting the emergency mode flag to "0", and thereafter the transaction is processed in normal mode.

The first electronic device 110 can also increment the transaction amount count by the transaction amount of the third message M3, and can then verify that the transaction amount count is less than a transaction amount threshold value.

If the incremented transaction amount count is greater than the transaction amount threshold value, then the first electronic device 110 deactivates the emergency mode procedure PMS, typically by setting the emergency mode flag to "0", and thereafter the transaction is processed in normal mode.

In the event that the verification(s) are effected successfully, the first electronic device 110 can accept the transaction.

After receiving the third message M3, typically after carrying out the verification(s), the first electronic device 110 can generate a cryptogram CR in a step F560, said cryptogram CR being generated by means of the second key dedicated to the emergency mode, said second key typically being symmetrical.

The cryptogram CR as generated comprises at least one information element about the emergency mode procedure PMS selected from among the following:
 the starting date of said procedure PMS;
 the ending date of said procedure PMS;
 the identifier of said procedure PMS;
 an indication that said cryptogram CR was generated while carrying out said procedure PMS.

The cryptogram CR is generated and sent in the event of the transaction being accepted, and also in the event of the transaction being refused.

FIG. 7 shows an example of data D1 to D11 used for generating the cryptogram. The data D1 to D8 comes from the reader 130, and the data D9 to D11 is data from the first electronic device 110, as defined in the Document "EMV 4.3, Book 2, 8.1.1".

Data D11 relating to the application of the first electronic device 110 comprises 32 bytes, bytes 18 to 32 being reserved to the transaction operator that implemented the application, as defined in Document "EMV 4.3, Book 3, C7.2". These bytes 18 to 32 comprise at least one of the information element concerning the procedure PMS as described above.

In addition, the bytes 4 to 8 of the card verification results (CVR) field in data D11 may comprise an information element about the type of cryptogram, an information element about whether the transaction has been refused (data AAC), an information element about whether the transaction has been accepted (data TC), an indication that said cryptogram CR was generated while carrying out said procedure PMS, etc. Typically, the value "RFU" in the "CVR byte 1" field of the CVR field may comprise an information element that a transaction was accepted in emergency mode.

The first electronic device 110 then sends a fourth message M4 to the reader 130, typically via the first network 140 or the second network 150, which message M4 comprises the cryptogram CR and may also comprise an information element to the effect that the transaction took place during the emergency mode procedure PMS (step F570).

The reader 130 receives the fourth message M4 (step H570) and stores the cryptogram CR (step H580). If the transaction is validated, the reader 130 transmits information elements about the transaction to the transaction network 120 (typically to the normal mode server 124), after that the emergency mode procedure PMS is deactivated, so that the normal mode server 124 can process the transaction once the transaction network 120 is once more capable of operating normally. The normal mode server 124 then verifies the cryptogram CR.

As shown in FIG. 6, after processing the failure or the attack, when the transaction network 120 is capable of functioning normally once more, the emergency mode server 122 deactivates the emergency mode procedure PMS in a step E610.

The normal mode server 124 is then capable of replying to consultation requests such as the consultation request RQ sent by the reader 130 in step H530.

Thus on receiving, I630, the consultation request RQ sent in step H530, the normal mode server 124 sends a deactivation command CDA to the reader 130 for deactivating the emergency mode procedure PMS, typically via the third telecommunications network 126 (step I640), the reader 130 transmits (step H640) said deactivation command CDA to the first electronic device 110, typically via the second telecommunications network 150.

The first electronic device 110 receives, F640, the deactivation command CDA, and then executes it in order to deactivate the emergency mode procedure PMS (step F650). The transaction can then be processed in normal mode.

The deactivation command CDA is typically a script command similar to the script commands defined by the EMV standard.

In a variant, when the emergency mode server 122 deactivates the emergency mode procedure PMS, the emergency mode server 122 sends the deactivation command CDA to the first electronic device 110, typically via the first telecommunications network 140. The deactivation command CDA may be sent on receiving the consultation request RQ or it may be sent after the emergency mode server 122 has deactivated the procedure PMS, even if no transaction concerning the first electronic device 110 is ongoing.

The invention claimed is:

1. A method of managing an emergency procedure of an emergency transaction mode that can be activated in the event of a computer attack on or a failure of a transaction network, the method being carried out in a system comprising an electronic device, a reader, an emergency mode server, and a normal mode server, said method comprising:
   detecting, by the emergency or the normal mode server, a computer attack or a failure of the transaction network;
   receiving, by the electronic device, an activation command from the emergency mode server causing activation of said emergency procedure, the activation command comprising an identifier of the emergency procedure and first encrypted data, wherein the first encrypted data is an authentication code;
   calculating, by the emergency mode server, the authentication code as a function of a private key, said private key being obtained by using the identifier of said emergency procedure;
   verifying, by the electronic device, that the activation command is successful, comprising verifying said first encrypted data;
   activating, by the electronic device, the emergency procedure and initializing a transaction between the electronic device and the reader;
   after activating the emergency procedure and after initializing the transaction between the electronic device and the reader, sending, by the electronic device, a message to said reader, the message comprising a consultation request for consulting the normal mode server of the transaction network;
   receiving, by the reader, said message and in response to receiving said message, attempting, by the reader, to connect with the normal mode server of the transaction network;
   determining, by the reader, that connection to the normal mode server has failed;
   receiving, by the electronic device, a message from the reader indicating that connection to the normal mode server has failed; and in response to receiving the message
   sending, by the electronic device, a cryptogram to said reader, the cryptogram comprising at least one information element about said emergency procedure.

2. The method according to claim 1, wherein the identifier of the emergency procedure is associated with a first value, and wherein the method further comprises verifying, by the electronic device, that the first value is greater than a second value of a procedure identifier stored in the electronic device.

3. The method according to claim 1, wherein the at least one information element about said emergency procedure of the cryptogram comprises one or more of the following:
   a starting date for said emergency procedure;
   an ending date for said emergency procedure;
   said identifier of said emergency procedure; and
   an indication whereby said cryptogram was generated while carrying out said emergency procedure.

4. The method according to claim 1, wherein said received message comprises a transaction date, and wherein the method further comprises:
   verifying, by the electronic device, that the transaction date lies between a starting date and an ending date for the emergency procedure; and
   if the transaction date is earlier than the starting date or later than the ending date for the procedure, deactivating, by the electronic device, said emergency procedure.

5. The method according to claim 1, wherein the received message comprises an amount of the transaction, and the method further comprises, by the electronic device:
   incrementing a transaction number count;
   incrementing a transaction amount count;
   determining that the incremented transaction number count is less than a transaction number threshold value and that the transaction amount count is less than a transaction amount threshold value, and
   accepting the transaction.

6. The method according to claim 1, further comprising:
   authenticating, by the electronic device, a user of the electronic device,
   wherein verifying that the activation command is successful is carried out only if the authenticating is successful.

7. The method according to claim 1, further comprising
   receiving, by the electronic device, a deactivation command from the reader or from the normal side server; and,
   deactivating, by the electronic device, said emergency procedure.

8. A system comprising an electronic device, the electronic device comprising:
   a first processor;
   a first non-transitory computer storage medium storing instructions that when executed by the first processor cause the first processor to perform operations comprising:
      receiving an activation command from an emergency mode server causing activation of said emergency procedure, the activation command comprising an identifier of the emergency procedure and first encrypted data, wherein the first encrypted data is an authentication code;
      verifying that the activation command is successful, comprising verifying said first encrypted data;
      activating the emergency procedure and initializing a transaction between the electronic device and a reader;
      after activating the emergency procedure and after initializing the transaction between the electronic device and the reader, sending a message to said reader, the message comprising a consultation request for consulting a normal mode server of the transaction network;

receiving a message from the reader indicating that connection to the normal mode server has failed; and in response to receiving the message sending a cryptogram to said reader, the cryptogram comprising at least one information element about said emergency procedure, the system further comprising the emergency mode server, the emergency mode server comprising:

a second processor;

a second non-transitory computer storage medium storing instructions that when executed by the second processor cause the second processor to perform operations comprising:

detecting a computer attack or a failure of the transaction network; and calculating the authentication code as a function of a private key, said private key being obtained by using the identifier of said emergency procedure;

the system further comprising the reader, the reader comprising:

a third processor;

a third non-transitory computer storage medium storing instructions that when executed by the third processor cause the third processor to perform operations comprising:

receiving, by the reader, said message comprising a consultation request for consulting the normal mode server of the transaction network; and, attempting to connect with the normal mode server of the transaction network; and, determining that connection to the normal mode server has failed.

9. The method according to claim 1 wherein the authentication code is a message authentication code, the method further comprising:

verifying, by the emergency mode server, integrity of the data of the activation command using a symmetrical key dedicated to emergency mode;

calculating, by the emergency mode server, the message authentication code using a session key derived from the symmetrical key and using the identifier of said emergency procedure as a derivation value.

10. The method according to claim 9, wherein verifying said first encrypted data comprises:

calculating, by the electronic device, second encrypted data, the second data being a message authentication code, the message authentication code being calculated using a session key derived from the symmetrical key and using the identifier of said emergency procedure as a derivation value; and, comparing the first and second encrypted data.

11. The method according to claim 1, wherein verifying, by the electronic device, that the activation command is successful comprises verifying that said emergency procedure is not already activated by checking value of an emergency mode flag.

12. The method according to claim 1, further comprising generating, by the electronic device, the cryptogram by using a symmetrical cryptographic key dedicated to the emergency mode.

* * * * *